United States Patent
Kaliner

(10) Patent No.: US 10,154,405 B2
(45) Date of Patent: Dec. 11, 2018

(54) CONTROL SERVER IN A COMMUNICATION NETWORK

(71) Applicant: Deutsche Telekom AG, Bonn (DE)

(72) Inventor: Stefan Kaliner, Koenigswinter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/662,303

(22) Filed: Jul. 28, 2017

(65) Prior Publication Data

US 2018/0035282 A1    Feb. 1, 2018

(30) Foreign Application Priority Data

Jul. 29, 2016 (EP) ..................................... 16181908

(51) Int. Cl.
| | |
|---|---|
| *H04M 1/00* | (2006.01) |
| *H04W 8/20* | (2009.01) |
| *H04M 15/00* | (2006.01) |
| *H04W 8/18* | (2009.01) |

(52) U.S. Cl.
CPC .......... *H04W 8/205* (2013.01); *H04M 15/00* (2013.01); *H04W 8/186* (2013.01); *H04W 8/183* (2013.01)

(58) Field of Classification Search
CPC ....... H04W 8/20; H04W 88/02; H04W 8/183; H04W 8/186; H04W 8/205; H04W 8/24; H04W 92/02; H04M 15/00
See application file for complete search history.

(56) References Cited

U.S. PATENT DOCUMENTS

| | | | |
|---|---|---|---|
| 8,489,119 B1 * | 7/2013 | Fraccaroli | ............... H04W 4/02 |
| | | | 379/201.06 |
| 2002/0126623 A1 | 9/2002 | Kiendl | |
| 2016/0126996 A1 * | 5/2016 | Jeong | .................. H04W 60/005 |
| | | | 455/558 |

FOREIGN PATENT DOCUMENTS

| | | |
|---|---|---|
| EP | 1117083 A2 | 7/2001 |
| EP | 2448301 A1 | 5/2012 |
| WO | WO 2016022228 A1 | 2/2016 |

\* cited by examiner

*Primary Examiner* — Nhan Le
(74) *Attorney, Agent, or Firm* — Leydig, Voit & Mayer, Ltd.

(57) ABSTRACT

A control server includes: a communication interface for receiving a first identification of a first electronic subscriber identification module and/or a second identification of a second electronic subscriber identification module; and a processor, configured to assign a first partial data volume of the data volume to the first electronic subscriber identification module and/or a second partial data volume of the data volume to the second electronic subscriber identification module according to an electronic distribution rule.

16 Claims, 2 Drawing Sheets

CONTROL SERVER IN A COMMUNICATION NETWORK

CROSS-REFERENCE TO RELATED APPLICATIONS

Priority is claimed to European Patent Application No. EP 16 181 908.1, filed on Jul. 29, 2016, the entire disclosure of which is hereby incorporated by reference herein.

FIELD

The present disclosure relates to the field of electronic subscriber identification modules (eSIM: electronic Subscriber Identification Module).

BACKGROUND

Electronic Subscriber Identification Modules (eSIMs) are implemented in mobile communication devices as hardwired hardware circuits. For communication over a communication network, each eSIM utilizes a communication profile (eSIM-profile), which is assigned to an operator of the communication network. The communication profile determines the communication capability, such as a data volume for the mobile communication device equipped with an eSIM in the framework of a contractual relationship.

If a mobile communication device, for instance in the context of Internet of Things, has an eSIM, a profile is assigned to the eSIM, which defines for example a data volume for the eSIM according to a contractual relationship.

SUMMARY

In an exemplary embodiment, the present invention provides a control server for distributing a data volume in a communication network. The data volume is assigned to a group of electronic subscriber identification modules, wherein the group of electronic subscriber identification modules comprises a first electronic subscriber identification module and a second electronic subscriber identification module. The control server includes: a communication interface for receiving a first identification of the first electronic subscriber identification module and/or a second identification of the second electronic subscriber identification module; and a processor, configured to assign a first partial data volume of the data volume to the first electronic subscriber identification module and/or a second partial data volume of the data volume to the second electronic subscriber identification module according to an electronic distribution rule.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
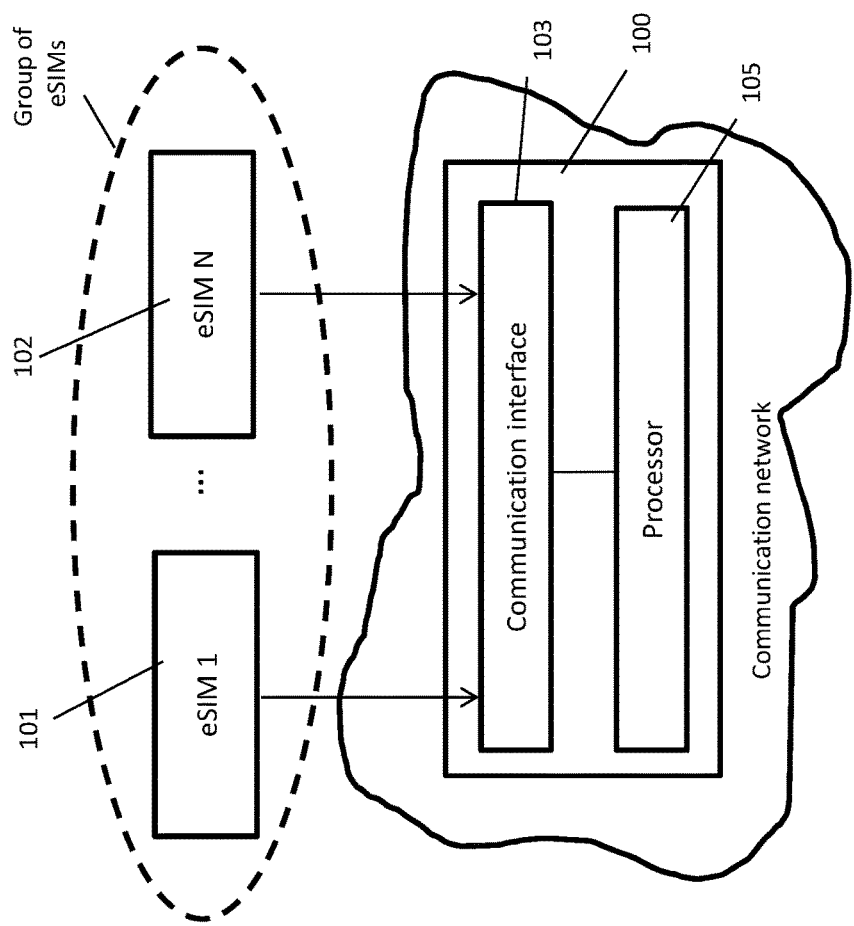
FIG. 1 depicts a control server.

Exemplary embodiments of the disclosure provide for efficiently controlling data volume for a group of electronic subscriber identification modules, which are installed for example in different communication devices of a user.

An exemplary embodiment includes a division of a data volume, which is available for a group of electronic subscriber identification modules. Thereby, this distributes the available bandwidth for the group of electronic subscriber identification modules to the electronic subscriber identification modules. The distribution of the data volume can be performed in a dynamic or provisioned manner.

According to a first aspect the disclosure relates to a control server in a communication network, wherein the control server is provided for the distribution of a data volume, which is assigned to a group of electronic subscriber identification modules, wherein the group of electronic subscriber identification modules comprises a first subscriber identification module and a second subscriber identification module, comprising: a communication interface for receiving a first identification of the first subscriber identification module and/or a second identification of the second subscriber identification module; and a processor, which is configured to assign a first partial data volume of the data volume to the first electronic subscriber identification module and/or a second partial data volume of the data volume to the second electronic subscriber identification module according to an electronic distribution rule.

In an embodiment, the processor is configured to determine or readout the first partial data volume and/or the second partial data volume from a memory of the control server.

In an embodiment, the processor is configured to determine the first partial data volume and/or the second partial data volume depending on quality of service requirements (QoS: Quality of Service) of the respective electronic subscriber identification module.

In an embodiment, the respective electronic subscriber identification module is an eSIM.

In an embodiment, the processor is configured to determine the first partial data volume and/or the second partial data volume according to a volume distribution key, for example proportionally or absolutely, which determines the distribution of the data volume on the electronic subscriber identification modules of the group of electronic subscriber identification modules and is assigned to the group of electronic subscriber identification modules.

In an embodiment, the processor is configured to determine the first partial data volume and/or the second partial data volume depending on a used data volume, which is assigned to the first electronic subscriber identification module, and a used data volume, which is assigned to the second electronic subscriber identification module. The information about the respective used data volume can be retrieved, for instance, by the control server in a base station, which handles the data traffic of the respective electronic subscriber identification module.

In an embodiment, a first basic data volume is assigned to the first electronic subscriber identification module and/or wherein a second basic data volume is assigned to the second electronic subscriber identification module, and wherein the processor is configured to determine the first partial data volume depending on a residual data volume, which results from a difference between the first basic data volume and the residual data volume, and/or the second partial data volume depending on a residual data volume, which results from a difference between the second basic data volume and the residual data volume.

In an embodiment, the processor is configured to determine the respective partial data volume, if the respective residual data volume reaches or falls below a volume threshold.

In an embodiment, the processor is configured to determine the first partial data volume and/or the second partial data volume depending on a data volume usage per unit of time, which is assigned to the first electronic subscriber identification module and/or the second electronic subscriber identification module, or depending on a communication application, in particular a real-time application, which is assigned to the respective subscriber identification module, or depending on an electronic service, which is assigned to the respective subscriber identification module.

In an embodiment, the processor is configured to determine the first partial data volume and/or the second partial data volume in a predetermined, in particular provisioned, or dynamic manner depending on a current data volume usage, which is assigned to the respective electronic subscriber identification module.

In an embodiment, the communication interface is configured to receive information about the respective used data volume of a network entity, in particular of a base station.

In an embodiment, the communication interface is configured to transmit information about the first partial data volume and/or information about the second partial data volume to a network entity, which monitors a data volume usage, or to a base station.

In an embodiment, the first identification is an electronic identification (eID) or a subscriber identification, in particular IMSI (International Mobile Subscriber Identity), of the first electronic subscriber identification module and/or wherein the second identification is an electronic identification (eID) or a subscriber identification, in particular IMSI, of the second electronic subscriber identification module, and/or wherein the respective electronic subscriber identification module is an eSIM.

In an embodiment, the control server is arranged in a communication network.

According to a second aspect the disclosure relates to a method for distributing a data volume, which is assigned to a group of electronic subscriber identification modules, wherein the group of electronic subscriber identification modules comprises a first subscriber identification module and a second subscriber identification module, comprising: receiving a first identification of the first subscriber identification module and/or a second identification of the second subscriber identification module; assigning a first partial data volume of the data volume to the first electronic subscriber identification module; and/or assigning a second partial data volume of the data volume to the second electronic subscriber identification module.

In an embodiment, the first partial data volume and/or the second partial data volume are assigned and/or determined by a control server, in particular by the control server according to the first aspect.

In an embodiment, the method is determined by the control server according to the first aspect.

According to a third aspect the disclosure relates to a subnetwork of a communication network comprising a plurality of subnetworks, in particular of point-to-point-subnetworks, wherein the subnetwork is provided for distributing a data volume, which is assigned to a group of electronic subscriber identification modules, wherein the group of electronic subscriber identification modules comprises a first subscriber identification module and a second subscriber identification module, comprising the control server according to the first aspect, wherein the control server is exclusively addressable via the subnetwork. In this respect, a router can be connected to the control server in the subnetwork. The subnetwork can further comprise a subnetwork-identifier.

In an embodiment, the subnetwork is a point-to-point-subnetwork or a slice of a 5G-communication-network.

In an embodiment, the control server is configured to transmit information about the first partial data volume to a further subnetwork of the communication network, which is provided for a communication of the first electronic subscriber identification module, and/or wherein the control server is provided to transmit information about the second partial data volume to a further subnetwork of the communication network, which is provided for a communication of the second electronic subscriber identification module. The further subnetworks can be 5G-Slices.

FIG. 1 shows a control server 100 for distributing a data volume, which is assigned to a group of electronic subscriber identification modules, wherein the group of electronic subscriber identification modules comprises a first subscriber identification module 101 and a second subscriber identification module 102, for example, eSIM.

The control server 100 comprises a communication interface 103, for instance a Long-Term Evolution (LTE)—or Universal Mobile Telecommunications Service (UMTS)—communication-interface, for receiving a first identification of the first subscriber identification module 101 and/or a second identification of the second subscriber identification module 102 and a processor 105, which is configured to assign a first partial data volume of the data volume to the first electronic subscriber identification module 101 and/or a second partial data volume of the data volume to the second electronic subscriber identification module 102 according to an electronic distribution rule.

The data volume can be assigned to the group of electronic subscriber identification modules contractually, wherein the distribution of the data volume on the electronic subscriber identification modules can be effected by the control server 100.

The electronic subscriber identification modules 101, 102 can comprise for instance communication profiles, such as eSIM-profiles, in which the prioritization of the electronic subscriber identification modules is indexed among themselves with respect to the data volume to be distributed. In this regard, for instance, a distribution key, according to which the data volume can be distributed on the electronic subscriber identification modules 101, 102, can be simulated. In an embodiment, the control server 100 can distribute the data volume on the electronic subscriber identification modules on the basis of profile information, which relates to the communication profiles and assign a partial data volume to the electronic subscriber identification modules 101, 102 respectively.

The control server 100 can, however, also provide the distribution of the data volume statically or dynamically.

The control server 100 can be arranged in a mobile radio network, for instance LTE or UMTS, and communicate with entities of the mobile radio network.

Figure 2:
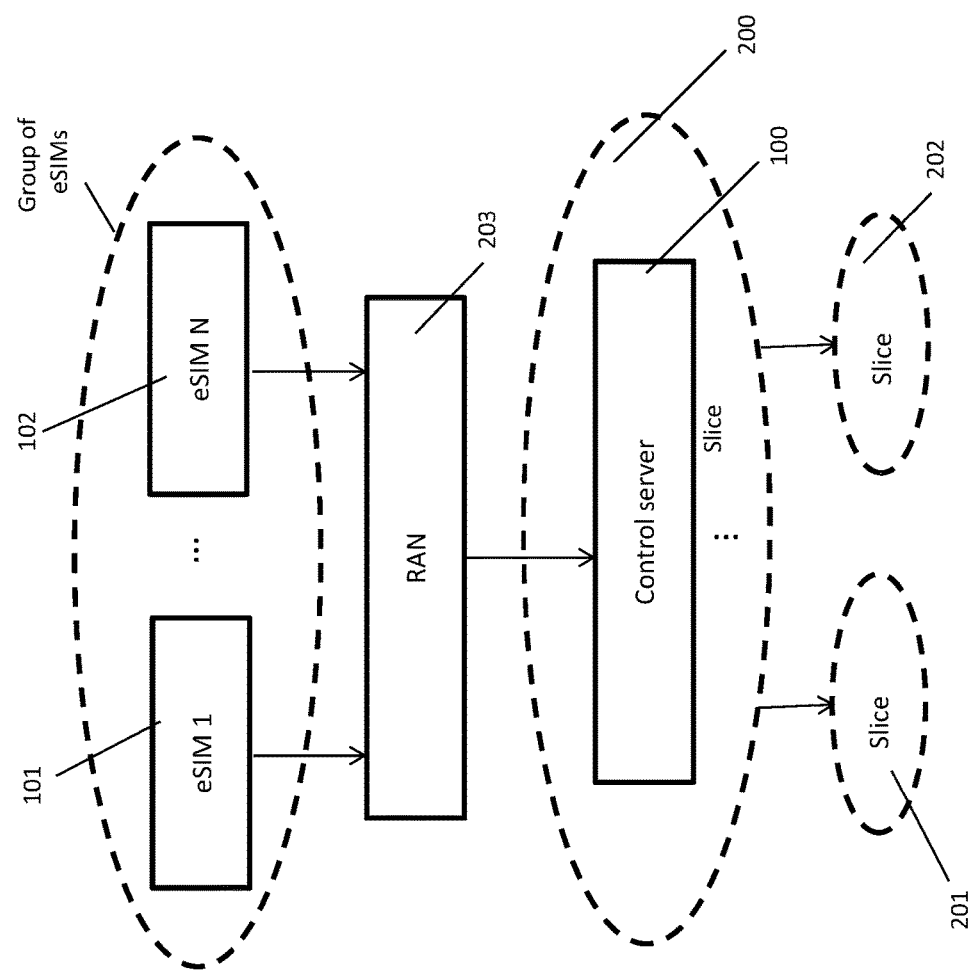
FIG. 2 depicts a subnetwork.

The function of the control server 100 can also be implemented for instance as service by a subnetwork, e.g. slice, of a 5G-communication-network, as shown in FIG. 2.

In an embodiment, a user can distribute the data volume on the eSIMs 101, 102 or assign the data volume to the eSIMs 101, 102 by himself, for instance, via a portal.

In an embodiment, the distribution of the data volume on the eSIMs can be performed in a device-specific manner depending on a device type of the communication devices comprising the eSIMs 101, 102. In this regard, for example, a communication device, which is implemented in a household device, can receive less partial data volume than a smartphone comprising the eSIM.

The electronic subscriber identification modules 101, 102 are implemented, for example, as eSIMs or eUICCs (embedded Universal Integrated Circuit Cards) in mobile or stationary communication devices.

In the case of a provisioned assignment, for example, the bandwidth can be stably distributed to the eSIMs in advance, for example, depending on a device type or on services to be expected.

FIG. 2 shows a subnetwork 200 of a communication network comprising a plurality of subnetworks, in particular of point-to-point-subnetworks or slices, wherein the subnetwork 200 is provided for distributing a data volume, which is assigned to a group of electronic subscriber identification modules. The control server 100 is arranged in the subnetwork and is exclusively addressable via the subnetwork 200 or via the subnetwork-address preferably. The subnetwork 200 is preferably a point-to-point-subnetwork or a slice of a 5G-communication-network. The subnetwork can further implement a radio access or a radio access network (RAN: Radio Access Network).

In an embodiment, the control server 100 is configured to transmit information about the first partial data volume to a further subnetwork 201 of the communication network, which is provided for a communication of the first electronic subscriber identification module 101, and/or wherein the control server 100 is provided to transmit information about the second partial data volume to a further subnetwork 202 of the communication network, which is provided for a communication of the second electronic subscriber identification module 102. The subnetworks 201, 202 can, for instance, implement different services of a 5G-communication-network.

In an embodiment, the subnetwork 200 is accessible via a radio access network 203 (RAN).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A control server for distributing a data volume in a communication network, wherein the data volume is assigned to a group of electronic subscriber identification modules, wherein the group of electronic subscriber identification modules comprises a first electronic subscriber identification module and a second electronic subscriber identification module, the control server comprising:
   a communication interface for receiving a first identification of the first electronic subscriber identification module and a second identification of the second electronic subscriber identification module; and
   a processor, configured to assign a first partial data volume of the data volume to the first electronic subscriber identification module and a second partial data volume of the data volume to the second electronic subscriber identification module according to an electronic distribution rule;
   wherein the communication network is a 5G communication network, the data volume corresponds to a service by a slice of the 5G communication network, and the control server is disposed in the slice of the 5G communication network; and
   wherein the first electronic subscriber identification module and the second electronic subscriber identification module are installed in different devices of a user.

2. The control server according to claim 1, wherein the processor is further configured to determine or readout the first partial data volume and/or the second partial data volume from a memory of the control server.

3. The control server according to claim 1, wherein the processor is configured to determine the first partial data volume and/or the second partial data volume according to a volume distribution key which determines the distribution of the data volume on the electronic subscriber identification modules of the group of electronic subscriber identification modules and is assigned to the group of electronic subscriber identification modules.

4. The control server according to claim 1, wherein the processor is configured to determine the first partial data volume and/or the second partial data volume depending on a used data volume which is assigned to the first electronic subscriber identification module and a used data volume which is assigned to the second electronic subscriber identification module.

5. The control server according to claim 4, wherein a first basic data volume is assigned to the first electronic subscriber identification module and/or wherein a second basic data volume is assigned to the second electronic subscriber identification module; and
   wherein the processor is configured to determine the first partial data volume depending on a first residual data volume, wherein the first partial data volume corresponds to a difference between the first basic data volume and the first residual data volume, and/or the second partial data volume depending on a second residual data volume, wherein the second partial data volume corresponds to a difference between the second basic data volume and the second residual data volume.

6. The control server according to claim 5, wherein the processor is configured to determine the respective partial data volume if the respective residual data volume reaches or falls below a volume threshold.

7. The control server according to claim 1, wherein the processor is configured to determine the first partial data volume and/or the second partial data volume depending on a data volume usage per unit of time, which is assigned to the first electronic subscriber identification module and/or the second electronic subscriber identification module, or depending on a communication application, which is assigned to the respective electronic subscriber identification module, or depending on an electronic service, which is assigned to the respective electronic subscriber identification module.

8. The control server according to claim 1, wherein the processor is configured to determine the first partial data volume and/or the second partial data volume in a predetermined or dynamic manner depending on a current data volume usage, which is assigned to the respective electronic subscriber identification module.

9. The control server according to claim 8, wherein the communication interface is configured to receive information about the respective used data volume of a network entity.

10. The control server according to claim 1, wherein the communication interface is configured to transmit information about the first partial data volume and/or information about the second partial data volume to a network entity, which monitors a data volume usage.

11. The control server according to claim 1, wherein the first identification is an electronic identification (eID) or a subscriber identification of the first electronic subscriber identification module and wherein the second identification is an electronic identification (eID) or a subscriber identification of the second electronic subscriber identification module.

12. A method for distributing a data volume in a communication network, wherein the data volume is assigned to a group of electronic subscriber identification modules, wherein the group of electronic subscriber identification modules comprises a first electronic subscriber identification module and a second electronic subscriber identification module, the method comprising:
   receiving, by a control server, a first identification of the first electronic subscriber identification module and a second identification of the second electronic subscriber identification module; and
   assigning, by the control server, a first partial data volume of the data volume to the first electronic subscriber identification module and a second partial data volume of the data volume to the second electronic subscriber identification module;
wherein the communication network is a 5G communication network, the data volume corresponds to a service by a slice of the 5G communication network, and the control server is disposed in the slice of the 5G communication network; and
wherein the first electronic subscriber identification module and the second electronic subscriber identification module are installed in different devices of a user.

13. The method according to claim 12, further comprising:
   determining the first partial data volume and/or the second partial data volume.

14. A subnetwork of a communication network comprising a plurality of subnetworks, wherein the subnetwork is provided for distributing a data volume, which is assigned to a group of electronic subscriber identification modules, wherein the group of electronic subscriber identification modules comprises a first electronic subscriber identification module and a second electronic subscriber identification module, the subnetwork comprising:
   a control server exclusively addressable via the subnetwork, wherein the control server comprises:
      a communication interface for receiving a first identification of the first electronic subscriber identification module and a second identification of the second electronic subscriber identification module; and
      a processor, configured to assign a first partial data volume of the data volume to the first electronic subscriber identification module and a second partial data volume of the data volume to the second electronic subscriber identification module according to an electronic distribution rule;
   wherein the communication network is a 5G communication network, the subnetwork is a slice of the 5G communication network, and the data volume corresponds to a service by a slice of the 5G communication network; and
   wherein the first electronic subscriber identification module and the second electronic subscriber identification module are installed in different devices of a user.

15. The subnetwork according to claim 14, wherein the subnetwork is a point-to-point-subnetwork.

16. The subnetwork according to claim 14, wherein the control server is configured to transmit information about the first partial data volume and/or the second partial data volume to a further slice of the 5G communication network, which is provided for a communication of the first electronic subscriber identification module and/or a communication of the second electronic subscriber identification module.

* * * * *